April 28, 1970 W. G. BATTE 3,509,330
BINARY ACCUMULATOR WITH ROUNDOFF
Filed Nov. 25, 1966
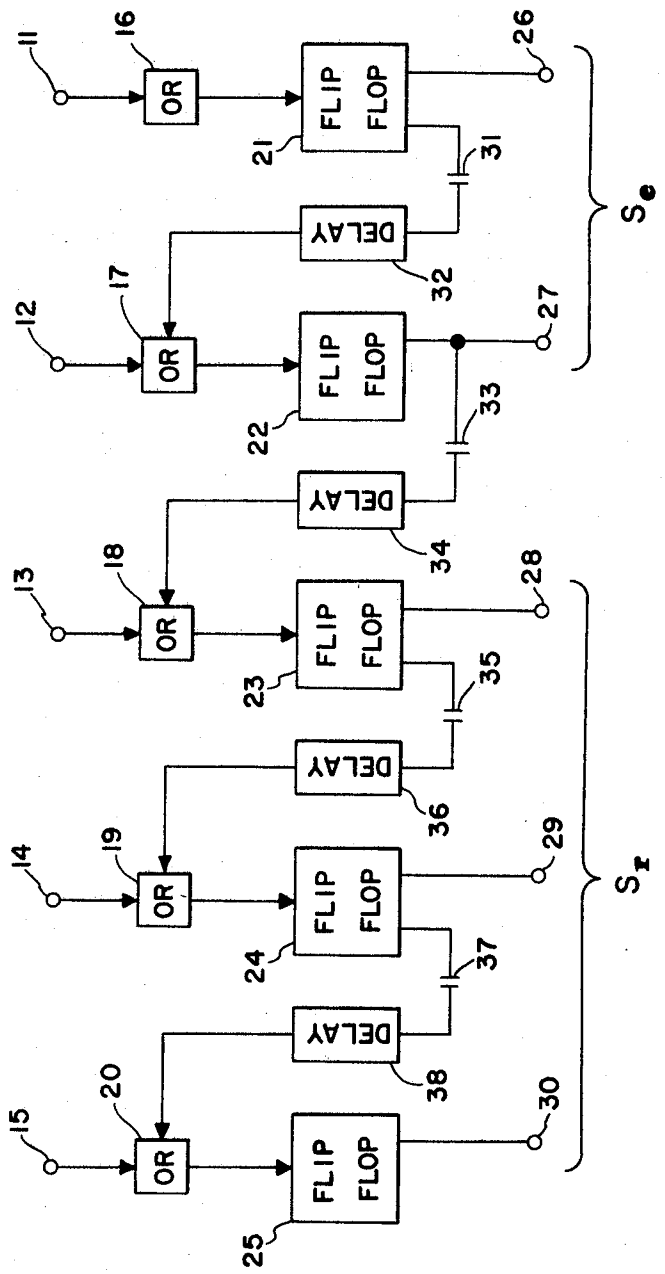
INVENTOR
WILLIAM G. BATTE
BY
William H. King
ATTORNEYS

United States Patent Office

3,509,330

Patented Apr. 28, 1970

3,509,330

BINARY ACCUMULATOR WITH ROUNDOFF

William G. Batte, 146 Westbrook Drive, Hampton, Va. 23366

Filed Nov. 25, 1966, Ser. No. 597,140
Int. Cl. G06f *7/385, 5/00*
U.S. Cl. 235—175 2 Claims

ABSTRACT OF THE DISCLOSURE

A binary accumulator that produces a summed output in two portions: the value of the output rounded off, and the plus or minus value of the roundoff error. There is a ratio of two-to-one between the least significant bit of the rounded off portion and the most significant bit of the roundoff error portion.

The invention described herein was made by an employee of the U.S. Government and may be manufactured or used by or for the Government for governmental purposes without the payment of any royalities thereon or therefor.

The invention relates generally to a binary accumulator and more specifically concerns a binary accumulator with roundoff.

The invention is a binary accumulator whose answer register contains the sum S in two portions: $S_r$— the value of S rounded off; and $S_e$— the plus or minus roundoff error. Hence $S=S_r+S_e$ such that $$|S_e| \leq \frac{S_{r1}}{2}$$

where $S_{r1}$ is the least significant bit of $S_r$.

An appreciation of $S_r$ and $S_e$ may be obtained from the following decimal, nontechnical, hypothetical application: a man routinely charges several items each week in a store. Once per month, he pays his bill to the nearest ten dollars; i.e., on his account which amounts to S he pays $S_r$, leaving $S_e$ (plus or minus) to be carried over to the next month. Thus, $S_r$, the amount that he pays, is some multiple of ten dollars and $S_e$ is some amount less than or equal to five dollars, (plus or minus), which is carried over.

The objects and advantages of this invention will become apparent hereinafter and in the single figure which is a block diagram of one of many possible embodiments of this invention.

In describing the embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the embodiment of the invention selected for illustration, the numbers 11, 12, 13, 14 and 15 designate the input terminals to the accumulator. These input terminals are connected through OR gates 16, 17, 18, 19 and 20, respectively, to flip-flops 21, 22, 23, 24 and 25. The sum outputs of these flip-flops are connected to output terminals 26, 27, 28, 29 and 30, respectively. The carry output of flip-flop 21 is applied through a capacitor 31, a delay 32, and gate 17 to the input of flip-flop 22; the sum output of flip-flop 22 is applied through a capacitor 33, a delay 34, and gate 18 to flip-flop 23; the carry output of flip-flop 23 is applied through a capacitor 35, a delay 36, and gate 19 to flip-flop 24; and the carry output of flip-flop 24 is applied through a capacitor 37, a delay 38, and gate 20 to flip-flop 25.

The purpose of capacitors 31, 33, 35 and 37 is to generate pulses when flip-flops 21, 22, 23 and 24 reset. The purpose of the delays 32, 34, 36 and 38 is to assure that the pulses produced by capacitors 31, 33, 35 and 37 do not coincide with the inputs on terminals 12, 13, 14 and 15, respectively. If the inputs to the input terminals are staggered so that they do not coincide with the pulses produced by the capacitors, the delays are not needed. Note that the only difference between this invention and similar prior art accumulators, is that the sum output (not the carry output) from flip-flop 22 is applied to flip-flop 23.

In operation, if a series of binary coded inputs are applied to the input terminals 11–15, the rounded off sum $S_r$ of this series of inputs will appear on output terminals 28, 29 and 30, and the error sum $S_e$ will appear on output terminals 26 and 27.

As an example, assume that a logical "1" (true) input applied to terminal 11 represents ¼; a logical "1" input applied to terminal 12 represents ½; a logical "1" input applied to terminal 13 represents 1; a logical "1" input applied to terminal 14 represents 2; a logical "1" input applied to terminal 15 represents 4; and a logical "0" (false) input applied to any of these terminals represent zero. Then the $S_r$ output is the rounded off sum of the inputs to the nearest whole number and the $S_e$ output is the error output. The following partial table shows how the values of $S_r$ and $S_e$ are coded on output terminals 26–30.

TABLE

| | | | $S_r$ Terminals | | | $S_e$ Terminals | |
|---|---|---|---|---|---|---|---|
| | | | 30 | 29 | 28 | 27 | 26 |
| S | $S_r$ | $S_e$ | $2^2$ | $2^1$ | $2^0$ | $2^{-1}$ | $2^{-2}$ |
| 4.75 | 5 | −.25 | 1 | 0 | 1 | 1 | 1 |
| 4.50 | 5 | −.50 | 1 | 0 | 1 | 1 | 0 |
| 4.25 | 4 | .25 | 1 | 0 | 0 | 0 | 1 |
| . . . | . . . | . . . | . . . | . . . | . . . | . . . | . . . |
| . . . | . . . | . . . | . . . | . . . | . . . | . . . | . . . |
| . . . | . . . | . . . | . . . | . . . | . . . | . . . | . . . |
| .75 | 1 | −.25 | 0 | 0 | 1 | 1 | 1 |
| .50 | 1 | −.50 | 0 | 0 | 1 | 1 | 0 |
| .25 | 0 | .25 | 0 | 0 | 0 | 0 | 1 |
| 0 | 0 | 0 | 0 | 0 | 0 | 0 | 0 |
| 7.75 | 0 | −.25 | 0 | 0 | 0 | 1 | 1 |
| 7.50 | 0 | −.50 | 0 | 0 | 0 | 1 | 0 |
| 7.25 | 7 | .25 | 1 | 1 | 1 | 0 | 1 |
| 7.00 | 7 | 0 | 1 | 1 | 1 | 0 | 0 |
| 6.75 | 7 | −.25 | 1 | 1 | 1 | 1 | 1 |
| 6.50 | 7 | −.50 | 1 | 1 | 1 | 1 | 0 |

As can be seen from this table, when the roundoff error $S_e$ is positive, the error appears on terminals 26 and 27 in the conventional binary form; however, when $S_e$ is negative, it appears on terminals 26 and 27 in two's complement form. The state of terminal 27, in addition to representing $2^{-1}$, indicates the sign of $S_e$. If a logical "0" appears on terminal 27 the sign of $S_e$ is positive and if a logical "1" appears on terminal 27 the sign of $S_e$ is negative.

To demonstrate how the invention as disclosed in the figure operates, a specific example will be given. Assume that it is desired to add 2.50 to 4.75. Initially all of the output terminals 26–30 are reset so that each is a logical "0". The number 4.75 in conventional binary form $100.11_2$ is applied to the input terminals 11–15. Logical "1's" are applied to terminals 11, 12 and 15, and logical "0's" are applied to terminals 13 and 14. The logical "1's" applied to terminals 11, 12 and 15 pass through gates 16, 17 and 20, respectively, to flip-flops 21, 22 and 25 causing them to set. The setting of flip-flops 21, 22 and 25 cause logical "1's" to appear on terminals 26, 27 and 30. The setting of flip-flop 22 also causes capacitor 33 to produce a pulse which passes through delay 34 and gate 18 to flip-flop 23. This causes flip-flop 23 to set and produce a logical "1" at terminal 28. Therefore 101.11 appears on the output terminals which can be seen from the table to represent 4.75 with $S_r=5$ and $S_e=-.25$. The number 2.50, in conventional binary form $010.10_2$ is now applied to input terminals 11–15. Logical "1's" are applied to terminals 12 and 14, and logical "0's" are applied to terminals 11, 13 and 15. The logical "1's" applied to terminals 12 and 14 pass through gates 17 and 19, respectively, to flip-flops 22 and 24 causing flip-flop 22 to reset and flip-flop 24 to set. These changes in state of flip-flops 22 and 24 cause a logical "0" to appear on terminal 27 and a logical "1" to appear on terminal 29. Hence, 111.01 now appears on output terminals 26–30 which can be seen from the table to represent 7.25 with $S_r=7$ and $S_e=+.25$.

It is to be understood that the form of the invention herewith shown and described is to be taken as only one possible embodiment of the invention. Various changes may be made in the parts and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims. Even though a conventional binary version of the invention tas been disclosed, it is to be understood that many binary coded decimal versions would be operable. The only restriction is that the least significant bit of $S_r$ be twice as great as the most significant bit of $S_e$.

What is claimed is:

1. A binary aicumulator with roundoff comprising: a first group and a second group of flip-flops with each flip-flop corresponding to a different bit of a binary number and with the flip-flops in the first group corresponding to more significant bits than the flip-flops in the second group; an input to each of said flip-flops where an addend can be applied to said accumulator; a sum output and a carry output for each of said flip-flops; means for applying the sum output of the flip-flop corresponding to the most significant bit of said second group to the input of the flip-flop corresponding to the least significant bit of said first group; and means for applying the carry output of each flip-flop, other than the flip-flop corresponding to the most significant bit of said second group, to the input of the succeeding flip-flop whereby if inputs representing numbers are successively applied to the inputs of said two groups of flip-flops the sum outputs of said first group of flip-flops is the roundoff sum of said numbers to the nearest said least significant bit and the sum outputs of said second group of flip-flops is the error of said roundoff.

2. A binary accumulator with roundoff comprising: a first group and a second group of bistable devices with each bistable device corresponding to a different bit of a binary number and with the bistable devices in the first group corresponding to more significant bits than the bistable devices in the second group; an input to each of said bistable devices where an addend can be applied to said accumulator; a first output and a second output for each of said bistable devices; means for applying the first output of the bistable device corresponding to the most significant bit of said second group to the input of the bistable device corresponding to the least significant bit of said first group; and means for applying the second output of each bistable device, other than the bistable device corresponding to the most significant bit of said second group, to the input of the succeeding bistable device whereby if inputs representing numbers are successively applied to the inputs of said two groups of bistable devices the first outputs of said first group of bistable devices is the roundoff sum of said numbers to the nearest said least significant bit and the first outputs of said second group of bistable devices is the error of said roundoff.

References Cited

UNITED STATES PATENTS

| | | | |
|---|---|---|---|
| 2,719,670 | 10/1955 | Jacobs et al. | 235—175 X |
| 3,016,193 | 1/1962 | Brett et al. | 235—153 |
| 3,017,099 | 1/1962 | Booth | 235—175 |
| 3,197,623 | 7/1965 | Yii | 235—173 |
| 3,375,358 | 3/1968 | Franck | 235—175 |

OTHER REFERENCES

R. K. Richards, Arithmetic Operations in Digital Computers, D. Van Nostrand Co., Inc., 1955 pp. 174–176.

MALCOLM A. MORRISON, Primary Examiner

C. E. ATKINSON, Assistant Examiner

U.S. Cl. X.R.

235—164